United States Patent
Shen

(10) Patent No.: US 7,301,535 B2
(45) Date of Patent: Nov. 27, 2007

(54) 3D SUMMARY DISPLAY FOR REPORTING OF ORGAN TUMORS

(75) Inventor: Hong Shen, Plainsboro, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 213 days.

(21) Appl. No.: 11/203,725

(22) Filed: Aug. 15, 2005

(65) Prior Publication Data

US 2006/0066615 A1    Mar. 30, 2006

Related U.S. Application Data

(60) Provisional application No. 60/606,591, filed on Sep. 2, 2004.

(51) Int. Cl.
*G06T 17/00* (2006.01)
(52) U.S. Cl. .................... 345/324; 345/419; 382/132; 382/154; 600/407
(58) Field of Classification Search ................ 345/424, 345/419; 600/407; 382/154, 132
See application file for complete search history.

(56) References Cited

U.S. PATENT DOCUMENTS

2004/0147830 A1   7/2004   Parker et al.

2004/0151358 A1   8/2004   Yanagita et al.

FOREIGN PATENT DOCUMENTS

| WO | WO 91/14397 | 10/1991 |
|---|---|---|
| WO | WO 03/077203 A2 | 9/2003 |
| WO | WO 2004/029851 A1 | 4/2004 |

OTHER PUBLICATIONS

Gering, A system for surgical planning and guidance using image fusion and interventional MR; published 1999, chapter 2, pp. 27-58.*
Bartz et al. "Hybrid Segmentation and Exploration of the Human Lungs", IEEE 2003, pp. 177-184.*

* cited by examiner

*Primary Examiner*—Kimbinh T. Nguyen
(74) *Attorney, Agent, or Firm*—MIchele L. Conover

(57) ABSTRACT

A computer-implemented method for visualizing a tumor in a volume data includes providing a plurality of tumors, detected and segmented from the volume data, storing locations of a plurality of voxels corresponding to each of the plurality of tumors, and determining a mesh of surface voxels for each of the plurality of tumors from the stored locations. The method further includes rendering the meshes for each of the plurality of tumors in a volume rendering window, selecting a tumor of interest from the plurality of tumors rendered in the volume rendering window, and determining a correspondence of the selected tumor to a slice of the volume data, wherein the slice of the volume data is displayed in a main window.

19 Claims, 5 Drawing Sheets

3D SUMMARY DISPLAY FOR REPORTING OF ORGAN TUMORS

This application claims priority to U.S. Provisional Application Ser. No. 60/606,591, filed on Sep. 2, 2004, which is herein incorporated by reference in its entirety.

BACKGROUND OF THE INVENTION

1. Technical Field

The present invention relates to medical image analysis, and more particularly to a system and method for a visualization tool for reporting tumors.

2. Discussion of Related Art

Lung cancer is a leading cause of cancer death in the United States. Averaging over all diagnosed cases of lung cancer, the mean 5-years survival rate is only 15%. However, for those specific lung cancers, which are diagnosed in an early stage, there is a much more favorable 5-year survival rate of up to 72%.

Recently, much attention has been given to lung cancer screening an diagnosis with computed tomography (CT). Multi-slice CT machines are capable of scanning the entire lung volume at very high resolution in a single breath-hold, allowing for the detection of very small to large sized nodules.

Technologies exist for automatic nodule segmentation and detection from lung CT data. The locations of nodules are detected. Given a nodule location, the voxels that belong to the nodule are segmented from the volume data. It is natural to have a global 3-dimensional (3D) summary of detected and segmented nodules. This should be an integral part of the reporting system for lung nodules.

Previous reporting schemes use very little visualization. On a graph of the lung mark the locations of the nodules. It is ineffective and static, lacking 3D information. Further, only the locations are marked. There is no information about the shape and relative sizes of the nodules.

Therefore, a need exists for a system and method for a visualization tool providing location and shape information in a 3D display.

SUMMARY OF THE INVENTION

According to an embodiment of the present disclosure a computer-implemented method for visualizing a tumor in a volume data includes providing a plurality of tumors, detected and segmented from the volume data, storing locations of a plurality of voxels corresponding to each of the plurality of tumors, and determining a mesh of surface voxels for each of the plurality of tumors from the stored locations. The method further includes rendering the meshes for each of the plurality of tumors in a volume rendering window, selecting a tumor of interest from the plurality of tumors rendered in the volume rendering window, and determining a correspondence of the selected tumor to a slice of the volume data, wherein the slice of the volume data is displayed in a main window.

The method further includes storing locations of a plurality of voxels corresponding to a reference structure in the volume data, determining a mesh of surface voxels for the reference structure from the stored locations of the plurality of voxels corresponding to the reference structure in the volume data, and rendering the mesh of surface voxels for the reference structure in the volume rendering window. The rendering of the mesh of surface voxels for the reference structure in the volume rendering window is semi-transparent. The method includes specifying a degree of transparency of the mesh of surface voxels for the reference structure in the volume rendering window.

The method further includes updating, automatically, the slice of the volume data displayed in the main window upon selecting the tumor of interest.

The method further includes indicating a position of the selected tumor in the slice of the volume data displayed in the main window.

Determining the correspondence of the selected tumor to the slice of the volume data further includes identifying the selected tumor in the volume rendering window, determining an orientation of a current view of the volume rendering window, selecting a voxel of interest in the volume rendering window, wherein the voxel corresponds to a 3D line in the volume data, evaluating all voxels on the 3D line, from front to back, comprising, searching, for each voxel, all tumor lists to determining whether a current voxel belongs to a tumor, wherein a first tumor intersected by the current voxel along the 3D line is determined to be the selected tumor, identifying the first tumor intersected by the current voxel to be the selected tumor, and displaying the slice in the volume data corresponding to the first tumor intersected by the current voxel in the main display.

According to an embodiment of the present disclosure, a program storage device is provided readable by machine, tangibly embodying a program of instructions executable by the machine to perform method steps for visualizing a tumor in a volume data. The method includes providing a plurality of tumors, detected and segmented from the volume data, storing locations of a plurality of voxels corresponding to each of the plurality of tumors, and determining a mesh of surface voxels for each of the plurality of tumors from the stored locations. The method further includes rendering the meshes for each of the plurality of tumors in a volume rendering window, selecting a tumor of interest from the plurality of tumors rendered in the volume rendering window, and determining a correspondence of the selected tumor to a slice of the volume data, wherein the slice of the volume data is displayed in a main window.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

A visualization tool, as shown in FIG. 1, includes two windows for display of data. A main window 101 displays a first view of volume data slice images including detected and segmented tumors, e.g., lung nodules. Slice data can be traversed using the main window, e.g., by scrolling through individual slices. A volume rendering window 102 displays a second view of the detected and segmented tumors using surface rendering. The surface rendering displays shapes and relative sizes of nodules.

Figure 1A:
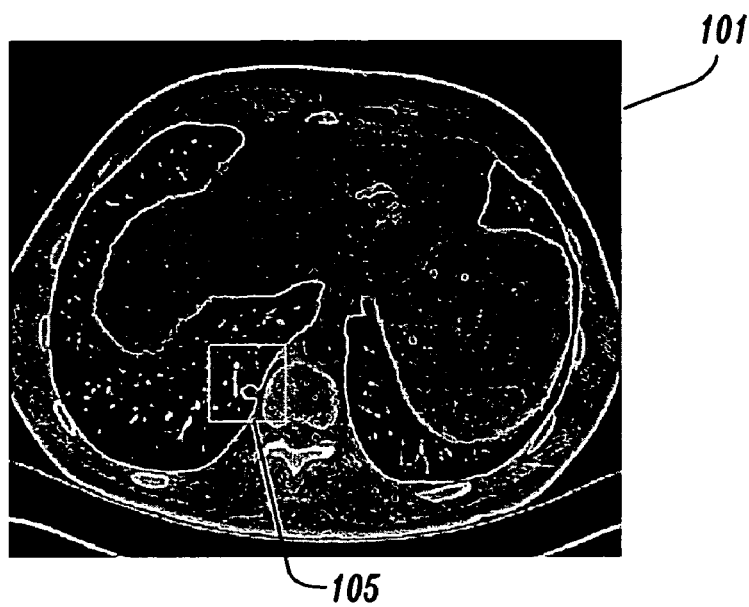
FIG. 1A is an illustration of a main window according to an embodiment of the present disclosure.
Figure 1B:
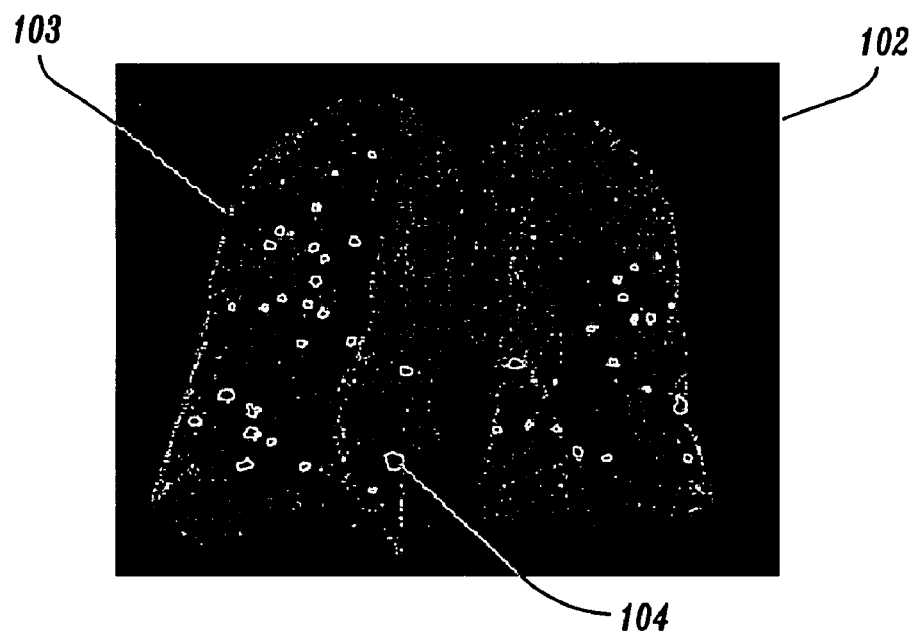
FIG. 1B is an illustration of a 3D window according to an embodiment of the present disclosure.

Anatomic features can be used as reference points in the second view. As shown in FIG. 1B, for example, two lung surfaces, e.g., 103, are rendered semi-transparently as the visual reference. However, other references can be used, such as the thoracic cage, airways or vessel trees.

Figure 2A:
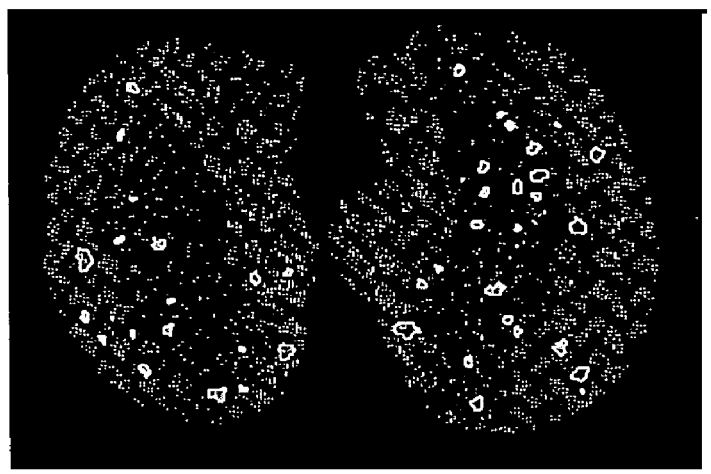
FIGS. 2A-B are illustrations of different views of a 3D display according to an embodiment of the present disclosure.
Figure 2B:
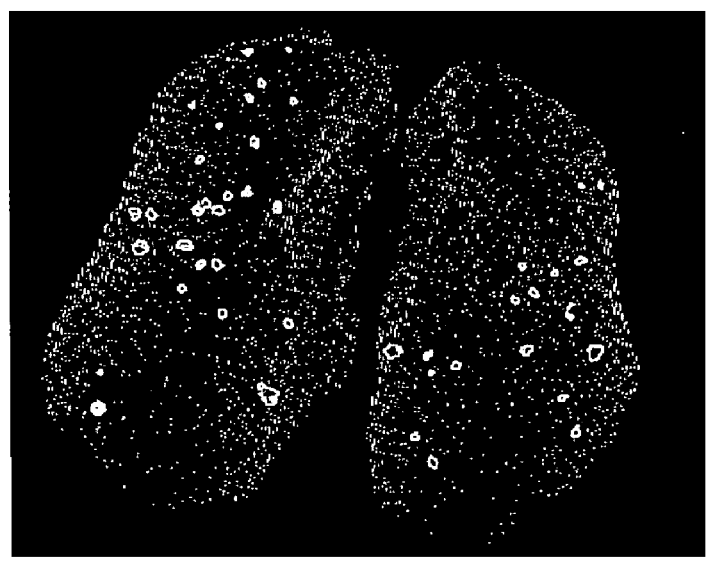

The view displayed in the volume rendering window 102 can be manipulated, e.g., rotated, zoomed, etc. Thus, different views of nodules can be achieved. In FIGS. 2A-B, two different views of the volume rendering window are shown. By manipulating the view of the volume rendering window, occluded nodules in one view can be viewed in a different view. A user can rotate the whole view and bring the nodule of interest to a front position. The user can also zoom the view at will to see an enlarged view of a nodule.

Figure 3:
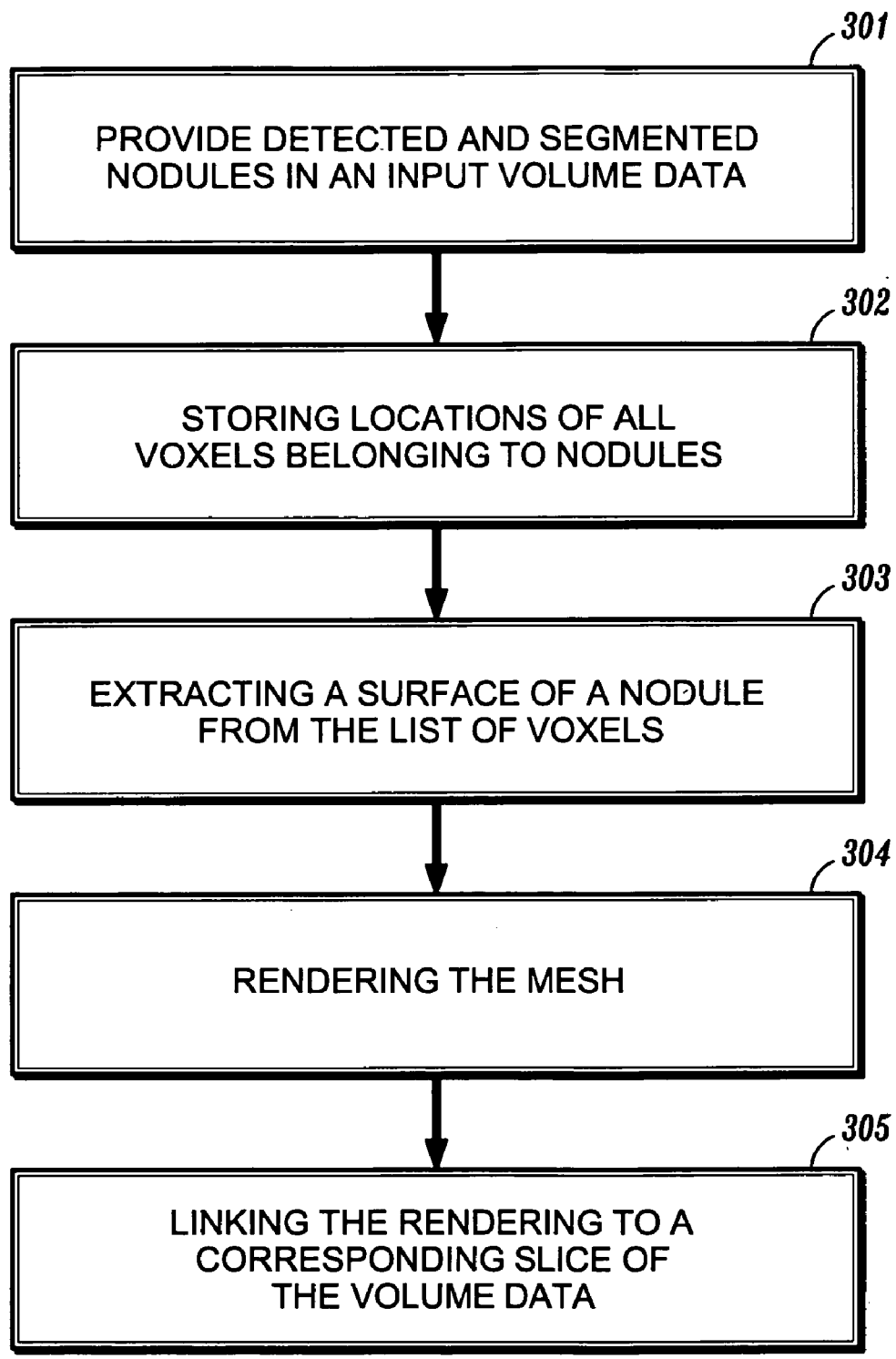
FIG. 3 is a flow chart of a method according to an embodiment of the present disclosure.

Referring to FIG. 3, before the display is constructed, the nodules are detected and segmented from the volume data 301. The locations of all the voxels that belong to a nodule are stored in a list 302. The 3D shape of each nodule is represented by such a list. Nodule surfaces are extracted from the list and form a mesh 303. The nodules surfaces may be extracted by, for example, a triangularization method that produces a triangle mesh defining a surface of a nodule. The meshes for all nodules are rendered using surface rendering methods 304, such as ray tracing methods. The rendering of the nodule is linked to the volume data 305, e.g., when viewing a particular nodule in the volume rendering window, a corresponding slice is displayed in the main window.

Block 303 may also include extracting surrounding anatomy from the volume data, to be used as a visual reference, such as the lung surfaces. Block 304 may include representing surfaces of the surrounding anatomy using a mesh, and rendered using a surface rendering method 304. The surface of the visual reference is rendered semi-transparently, so as not to block the viewing of nodules. A degree of transparency can be set by a user, e.g., between 0-100% transparency.

The volume rendering window serves as the summary of the nodule detection and segmentation result. The user can refer to the original volume data in the main window to get detailed 2D slice information. The volume rendering window is spatially related to the main window that displays the volume data. Upon selecting a nodule in the volume rendering window, a view of the main display is updated to a corresponding slice where the selected nodule is located. For example, a the corresponding slice is determined according to a 2D to 3D registration of the nodule to the slice data; because the nodule may be registered to more than one slice, a middle slice registered to the nodule may be selected. Other methods of selecting a slice are contemplated, for example, selecting a slice in which the nodule has a widest cross-section as compared to other slices registered to the nodule. The nodule selected from the volume rendering window (e.g., 104) can be outlined (e.g., 105) in the slice that is shown in the main window, as shown in FIG. 1A.

Figure 4:
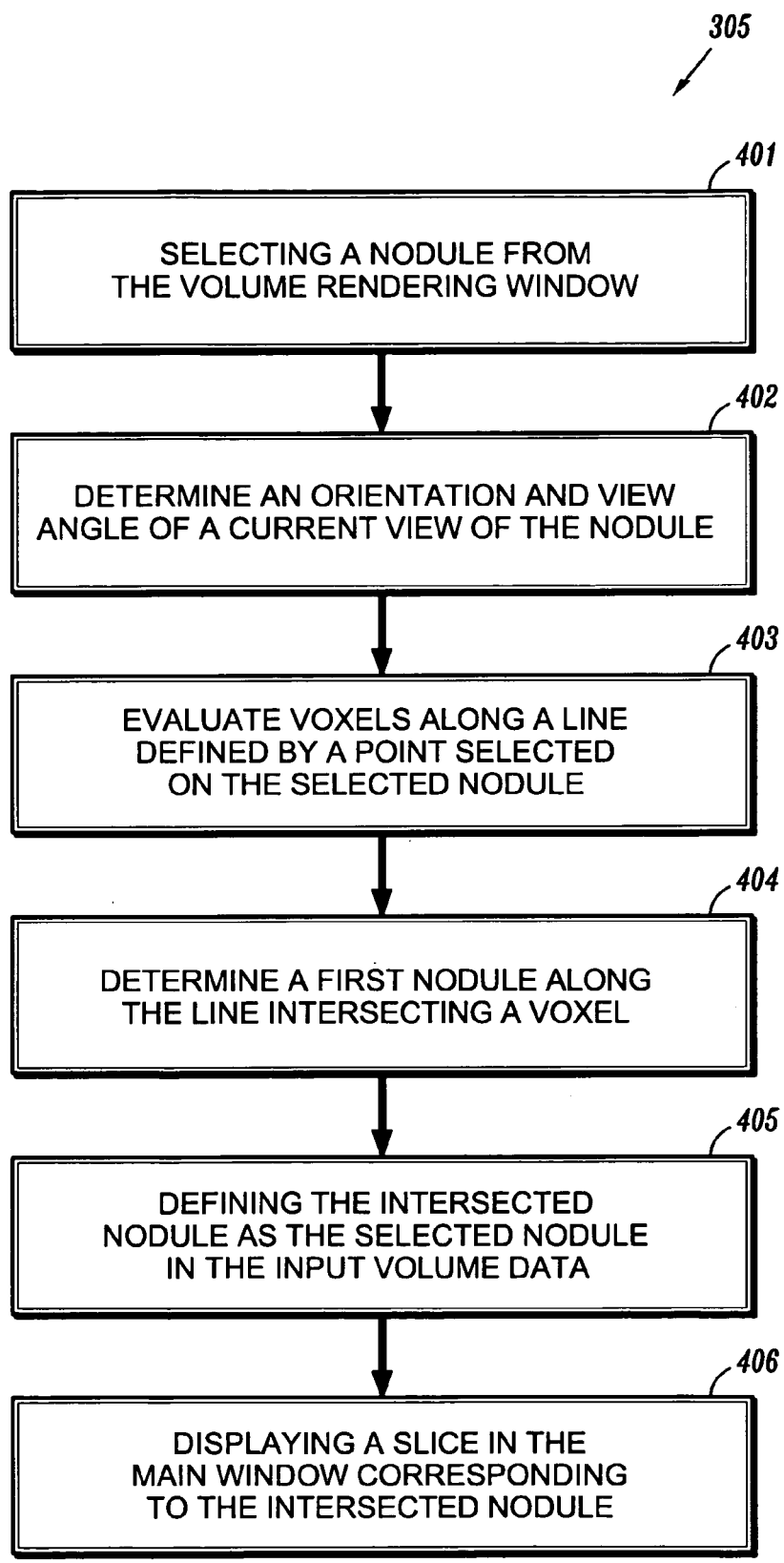
FIG. 4 is a flow chart of a method according to an embodiment of the present disclosure.

Referring to FIG. 4, the linking of the volume rendering window and the main window 305 includes identifying the selected nodule in the volume rendering window 401. At a given view, from the rendering system, the orientation of the current view angle is determined 402; geometric transformation information is known between the 2D window and 3D volume (e.g., registration information is determined during the rendering of the 3D view from the 2D slices). A click point, e.g., as by a mouse click or stylus selection, in the volume rendering window corresponds to a set of voxels in the volume data that sit on a 3D line in the volume data; the image shown in the volume rendering window is a projection of the 3D data. The 3D line is determined from the view of the user through the image. All voxels on the 3D line are evaluated 403, from front (e.g., the foreground of the user's view) to back, bounded by the extent of the volume data. For each voxel, all nodule lists are searched to determining whether the voxel belongs to a nodule. A first nodule intersected by a voxel along the 3D line is determined to be the selected nodule along the 3D line is selected 404. The first nodule is identified to be the selected nodule 405. A slice in the volume data corresponding to the nodule is displayed by the main display 406.

According to an embodiment of the present disclosure, a system and/or method for visualizing nodules augments reporting of lung nodules. It can be extended to the reporting of other similar pathologies, for example, liver tumors. The liver tumors can also be detected and segmented, and they can be displayed with the liver surfaces as the visual reference. Generally tumors within any organ can be visualized according to an embodiment of the present disclosure.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
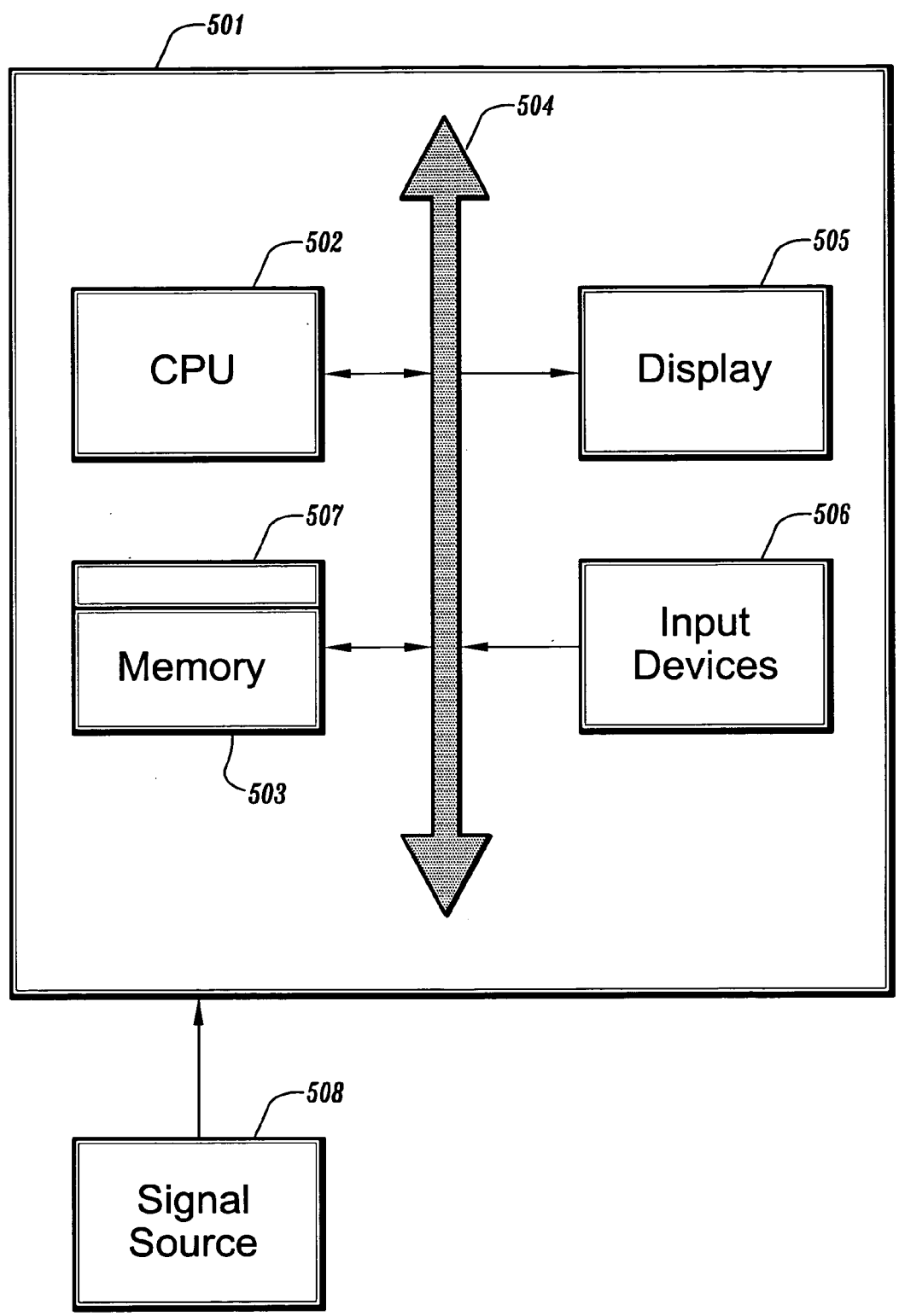
FIG. 5 is a diagram of a system according to an embodiment of the present disclosure.

Referring to FIG. 5, according to an embodiment of the present disclosure, a computer system 501 for implementing a method for a visualization tool providing location and shape information in a 3D display, inter alia, a central processing unit (CPU) 502, a memory 503 and an input/output (I/O) interface 404. The computer system 501 is generally coupled through the I/O interface 404 to a display 505 and various input devices 506 such as a mouse and keyboard. The display 505 can display views of the virtual volume and registered images. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general purpose computer system that becomes a specific purpose computer system when executing the routine 507 of the present invention.

The computer platform 501 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for a visualization tool for tumors, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for visualizing a tumor in a volume data comprising:
   providing a plurality of tumors, detected and segmented from the volume data;
   storing locations of a plurality of voxels corresponding to each of the plurality of tumors;
   determining a mesh of surface voxels for each of the plurality of tumors from the stored locations;
   rendering the meshes for each of the plurality of tumors in a volume rendering window;
   selecting a tumor of interest from the plurality of tumors rendered in the volume rendering window;
   determining a correspondence of the selected tumor to a slice of the volume data, wherein the slice of the volume data is displayed in a main window.

2. The computer-implemented method of claim 1, further comprising:
   storing locations of a plurality of voxels corresponding to a reference structure in the volume data;
   determining a mesh of surface voxels for the reference structure from the stored locations of the plurality of voxels corresponding to the reference structure in the volume data; and
   rendering the mesh of surface voxels for the reference structure in the volume rendering window.

3. The computer-implemented method of claim 2, wherein the rendering of the mesh of surface voxels for the reference structure in the volume rendering window is semi-transparent.

4. The computer-implemented method of claim 3, further comprising specifying a degree of transparency of the mesh of surface voxels for the reference structure in the volume rendering window.

5. The computer-implemented method of claim 1, further comprising updating, automatically, the slice of the volume data displayed in the main window upon selecting the tumor of interest.

6. The computer-implemented method of claim 1, further comprising indicating a position of the selected tumor in the slice of the volume data displayed in the main window.

7. The computer-implemented method of claim 1, wherein determining the correspondence of the selected tumor to the slice of the volume data further comprises:
   identifying the selected tumor in the volume rendering window;
   determining an orientation of a current view of the volume rendering window;
   selecting a voxel of interest in the volume rendering window, wherein the voxel corresponds to a 3D line in the volume data;
   evaluating all voxels on the 3D line, from front to back, comprising, searching, for each voxel, all tumor lists to determining whether a current voxel belongs to a tumor, wherein a first tumor intersected by the current voxel along the 3D line is determined to be the selected tumor;
   identifying the first tumor intersected by the current voxel to be the selected tumor; and
   displaying the slice in the volume data corresponding to the first tumor intersected by the current voxel in the main display.

8. The computer-implemented method of claim 1, wherein the slice of the volume data is automatically selected as a middle slice of the selected tumor.

9. The computer-implemented method of claim 1, wherein the slice of the volume data is automatically selected as a widest slice of the selected tumor.

10. A program storage device readable by machine, tangibly embodying a program of instructions executable by the machine to perform method steps for visualizing a tumor in a volume data, the method steps comprising:
    providing a plurality of tumors, detected and segmented from the volume data;
    storing locations of a plurality of voxels corresponding to each of the plurality of tumors;
    determining a mesh of surface voxels for each of the plurality of tumors from the stored locations;
    rendering the meshes for each of the plurality of tumors in a volume rendering window;
    selecting a tumor of interest from the plurality of tumors rendered in the volume rendering window;
    determining a correspondence of the selected tumor to a slice of the volume data, wherein the slice of the volume data is displayed in a main window.

11. The method of claim 10, further comprising:
    storing locations of a plurality of voxels corresponding to a reference structure in the volume data;
    determining a mesh of surface voxels for the reference structure from the stored locations of the plurality of voxels corresponding to the reference structure in the volume data; and
    rendering the mesh of surface voxels for the reference structure in the volume rendering window.

12. The method of claim 11, wherein the rendering of the mesh of surface voxels for the reference structure in the volume rendering window is semi-transparent.

13. The method of claim 12, further comprising specifying a degree of transparency of the mesh of surface voxels for the reference structure in the volume rendering window.

14. The method of claim 10, further comprising updating, automatically, the slice of the volume data displayed in the main window upon selecting the tumor of interest.

15. The method of claim 10, further comprising indicating a position of the selected tumor in the slice of the volume data displayed in the main window.

16. The method of claim 10, wherein determining the correspondence of the selected tumor to the slice of the volume data further comprises:
    identifying the selected tumor in the volume rendering window;
    determining an orientation of a current view of the volume rendering window;
    selecting a voxel of interest in the volume rendering window, wherein the voxel corresponds to a 3D line in the volume data;
    evaluating all voxels on the 3D line, from front to back, comprising, searching, for each voxel, all tumor lists to determining whether a current voxel belongs to a tumor, wherein a first tumor intersected by the current voxel along the 3D line is determined to be the selected tumor;

identifying the first tumor intersected by the current voxel to be the selected tumor; and displaying the slice in the volume data corresponding to the first tumor intersected by the current voxel in the main display.

17. The method of claim 10, wherein the slice of the volume data is automatically selected as a middle slice of the selected tumor.

18. The method of claim 10, wherein the slice of the volume data is automatically selected as a widest slice of the selected tumor.

19. A program storage device readable by machine, tangibly embodying a program of instructions executable by the machine to perform method steps for visualizing a tumor in a volume data, the method steps comprising:

providing a plurality of tumors, detected and segmented from the volume data;

storing locations of a plurality of voxels corresponding to each of the plurality of tumors;

determining a mesh of surface voxels for each of the plurality of tumors from the stored locations;

rendering the meshes for each of the plurality of tumors in a volume rendering window;

receiving a user selected point in the volume rendering window;

determining an orientation of a current view of the volume rendering window;

extending a voxel of interest in the form of a line from the user selected point through the volume data perpendicular to the orientation of the current view;

evaluating all voxels on the line, from the user selected point through the volume data, comprising, searching, for each voxel, all tumor lists to determining whether a current voxel belongs to a tumor, wherein a first tumor intersected by the current voxel along the line is determined to be a selected tumor; and determining a correspondence of the selected tumor to a slice of the volume data, wherein the slice of the volume data is displayed in a main window.

* * * * *